Feb. 24, 1970    E. L. CARLTON    3,497,238
SPLASH GUARDS
Filed Sept. 8, 1967    2 Sheets-Sheet 1
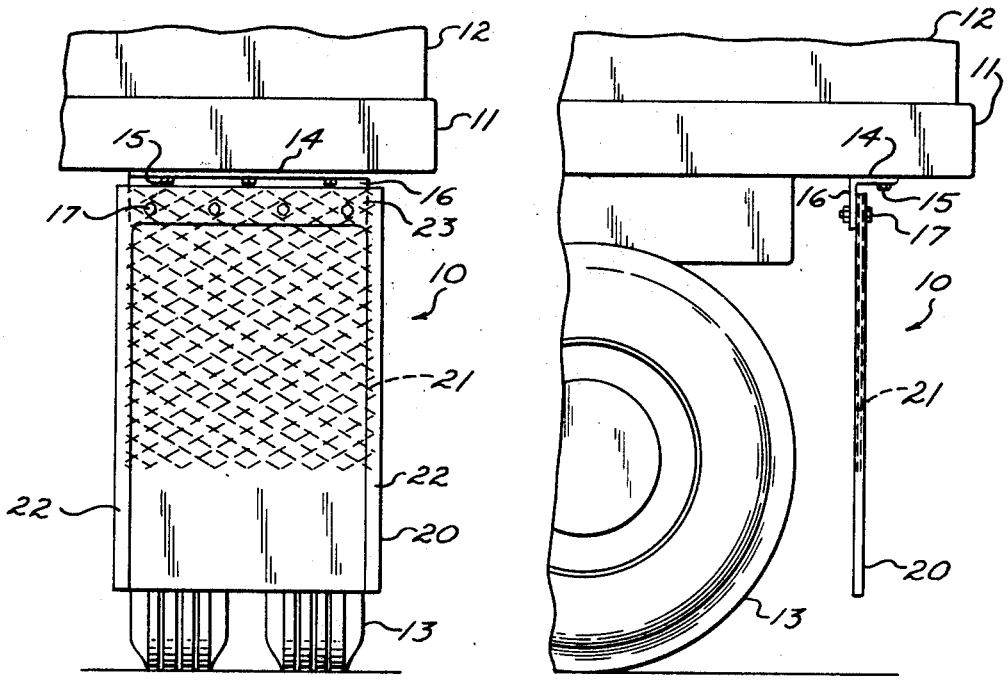
Fig. 1    Fig. 2
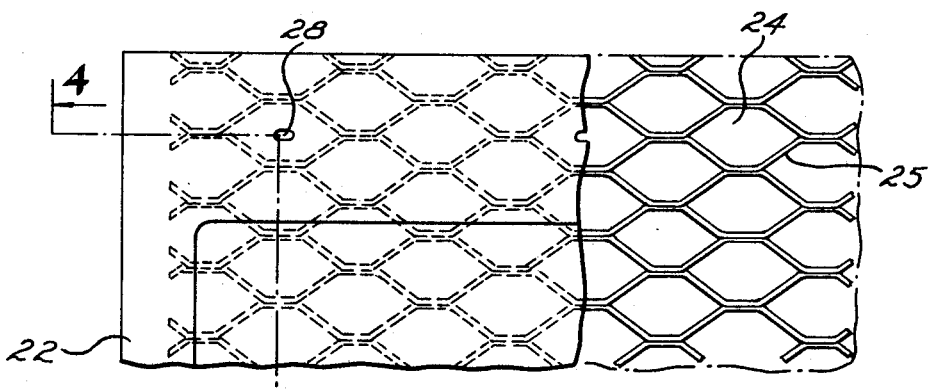
Fig. 3
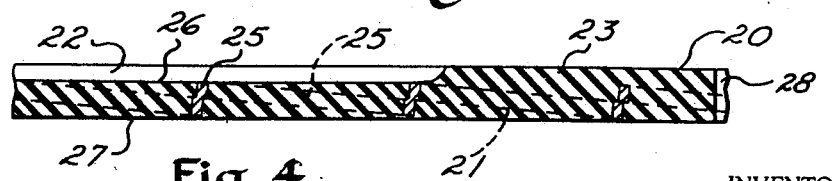
Fig. 4
INVENTOR.
Ewell Lee Carlton
BY
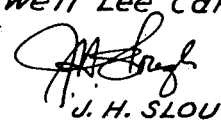
J. H. SLOUGH
ATTORNEY Feb. 24, 1970  E. L. CARLTON  3,497,238
SPLASH GUARDS Filed Sept. 8, 1967  2 Sheets-Sheet 2

INVENTOR
Ewell Lee Carlton
BY
J.H. SLOUGH
ATTORNEY

United States Patent Office 3,497,238
Patented Feb. 24, 1970

3,497,238
SPLASH GUARDS
Ewell Lee Carlton, 11850 Edgewater Drive,
Lakewood, Ohio 44107
Filed Sept. 8, 1967, Ser. No. 666,348
Int. Cl. B62d 9/16
U.S. Cl. 280—154.5        4 Claims

ABSTRACT OF THE DISCLOSURE

There is disclosed herein a splash guard for truck type vehicles comprising a flat slab of rubberlike material having a relatively rigid meshwork stiffener embedded therein by pressure prior to curing the material.

---

This invention relates to vehicle splash guards and particularly to splash guards for the rear wheels of heavy trucks, commercial trailers, and the like. The invention also relates to a method for making such vehicle splash guards.

Heavy truck and trailers of the type referred to are commonly provided with load carrying beds or body portions which extend rearwardly beyond dual supporting rear wheels. In the usual construction of such vehicles, fenders are not provided; moisture, mud, rocks, dust, and other debris are thrown rearwardly when the trucks are traveling along a roadway thereby creating hazardous conditions for vehicles approaching from behind. Splash guards, which generally comprise thick sheets of rubber or rubberlike material, are suspended from the overhanging truck bed behind the rear wheels of the vehicle to mitigate this danger. Various attempts have been made to provide a splash guard which is both effective and practical in use, but all of those known to the present inventor are objectionable for one reason or another. If the guard is tool flexible, it tends to flap or "sail" when the vehicle is in motion thereby uncovering part of the rear wheels and allowing debris to be thrown rearwardly toward oncoming traffic. Where wooden or metal reinforcement is applied to the guards, the reinforcing members tend to break or bend, especially when the vehicle is backed up to a loading dock and the guard is caught between a rear wheel and said dock as often happens.

It is an object of the present invention to provide a vehicle splash guard of the type referred to having means preventing flapping or "sailing" and which deflects rearwardly thrown debris in an improved manner.

Another object of the invention is to provide such a splash guard which is highly resistant to distortion, ripping, or tearing in use thereof.

Still another object of the invention is to provide a splash guard as set forth above wherein a stiffening reinforcement means is embedded within the guard for preventing bending of said guard.

Yet another object of the invention is to provide a splash guard as characterized above wherein said stiffening means is provided throughout at least substantially the top half of said guard.

A still further object of this invention is to provide a splash guard comprising a slab of sheet rubber or similar material having reinforcing means in the form of expanded metal embedded in a portion thereof.

A further object of the invention is to provide a method for manufacturing a splash guard wherein stiffening and reinforcing means is embedded within a slab of sheet rubber or similar material.

Another object of the invention is to provide a method for manufacturing a splash guard as set forth above wherein expanded metal reinforcing means is pressed into a slab of sheet rubber or similar material in uncured form after which said material is cured whereby the reinforcement becomes an integral part of the splash guard.

Other objects of the invention and the invention itself is disclosed in the following description of one embodiment thereof and the accompanying drawings, in which said drawings:

FIGURE 1 is an elevational view of the vehicle splash guard of this invention mounted behind a pair of dual truck wheels, only a portion of the truck being shown;

FIGURE 2 is a side view of the vehicle splash guard and truck portion of FIGURE 1;

FIGURE 3 is an enlarged fragmentary view of the upper left-hand corner portion of the vehicle splash guard as shown in FIGURE 1, the guard being removed from the truck;

FIGURE 4 is a section taken along the line 4—4 of FIGURE 3;

Figure 5:
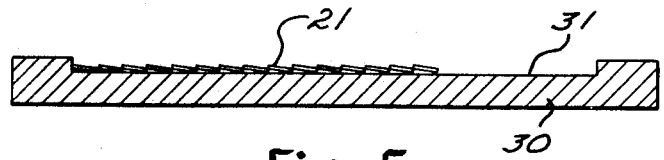
FIGURE 5 is a section through a mold showing a first step in the method of manufacturing the splash guard.

Referring now to the drawings in all of which like parts are designated by like reference numerals and particularly to FIGURES 1 and 2, the vehicle splash guard of this invention is generally shown at 10 attached to and suspended from the bed or body portion 11 of a truck 12 behind a pair of dual rear wheels 13. As herein illustrated, an angle bracket 14 is secured underneath the body portion 11 by any suitable means such as bolts 15. Said angle bracket 14 has a transversely disposed, downwardly projecting flange 16 to which the upper edge of the splash guard 10 is secured by means of nut and bolt assemblies 17.

The vehicle splash guard 10 comprises a rectangular sheet or slab 20 of rubber or rubberlike material having a stiffener member 21 embedded therein. In the form shown, the splash guard 10 has thickened side edge portions 22 and a thickened upper edge portion 23 which tends to stiffen the edges of said guard and protect the same against abrasion and wear.

As shown in FIGURES 3 and 4, the stiffener member 21 comprises a rectangular piece of expanded metal which is manufactured in a known manner by providing sheet metal with a plurality of parallel, closely spaced, transversely overlapping slits and then opening the slits to cause said slits to form generally diamond shape meshwork. Each opening in the mesh, indicated at 24, is defined by narrow strips 25 of sheet metal which overlap edgewise where the edges of each opening meet whereby the expanded metal has substantial thickness as illustrated in FIGURE 4. The connecting strips 25 of the expanded metal are oriented with the edges thereof disposed generally toward the flat surfaces of the splash guard 10, said strips affording many incising edges which bite into the sheet or slab 20 of rubber. It will be further noted in FIGURE 4 that portions of the edges of the strips 25 project through virtually the entire thickness of the slab 20 to the outer surfaces 26 and 27 thereof.

The expanded metal stiffener member 21 is extremely strong and rigid as will be readily appreciated by those familiar with the art. It is also superior to stiffening and reinforcing means used in vehicle splash guards with which the inventor is familiar. Such expanded metal stiffener member affords little bending of the flap in the area where it is applied, the embodiment disclosed showing approximately the upper two-thirds of the splash guard being thus reinforced. Additionally, the stiffener member 21 extends upwardly and laterally into the thickened edge portions 22 and 23 to more firmly anchor the meshwork at the sides and top of the splash guard and generally increase the stiffness thereof. In the form shown, flapping or sailing of the splash guard is completely eliminated due to the fact that there can be no appreciable bending or twisting of the upper two-thirds of the splash guard. Substantially all of the bending or flexing of the guard takes place in the lower portion thereof below the stiffener member 21, and this lower portion is of such short extent and of such distance from the ground as to present no hazard to traffic approaching from the rear of the truck. Debris from the truck wheels 13 is thrown almost entirely against the upper, reinforced portion of the splash guard.

It is anticipated that the expanded metal stiffener member 21 may be provided for any portion of the vehicle splash guard 10, but it is preferred that such stiffening means be provided throughout at least substantially the top half of said guard to be optimally effective.

It will further be noted in FIGURE 3 that the upper, thickened edge portion 23 of the splash guard is provided with a plurality of laterally elongated apertures 28 for bolting said splash guard to the flange 16 or other suitable mounting means carried by the truck. It is preferred that the stiffener member 21 extend substantially all the way to the upper edge of said splash guard whereby the apertures 28 extend through openings 24 in the expanded metal mesh. In this manner, the stiffener member 21 provides means for stiffening and reinforcing the upper mounting portion of the splash guard without interferring with the securing of the same to the vehicle.

Figure 6:
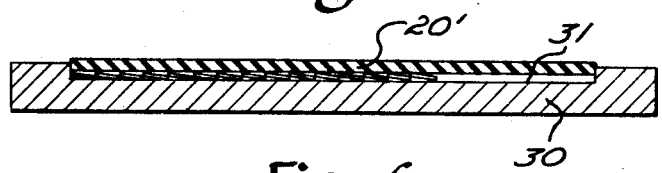
FIGURE 6 is a view similar to FIGURE 5, showing a second step in said method.
Figure 7:
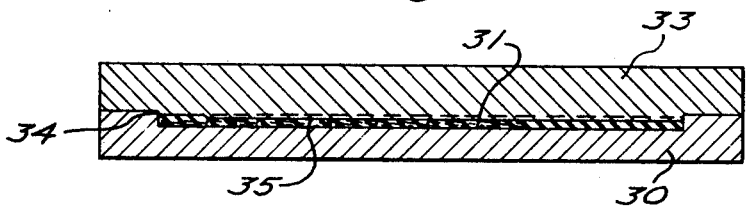
FIGURE 7 is a view similar to FIGURES 5 and 6 showing a third step in said method.

FIGURES 5, 6, and 7 show a preferred method whereby a vehicle splash guard 10 of this invention is manufactured. FIGURE 5 shows a bottom mold half 30 having a shallow, flat bottom cavity 31 of the correct size and shape for forming one side and the edges of the splash guard 10. A stiffener member 21 is laid in the cavity 31 with one edge of said stiffener member being disposed adjacent to one of the narrower ends of the cavity which corresponds to the upper end of the splash guard 10 in its finished form.

FIGURE 6 illustrates the next step wherein a rectangular sheet or slab of uncured rubber is laid in the cavity 31 over top of the stiffener member 21. The uncured slab in FIGURE 6 is designated at 20' to distinguish it from the sheet or slab 20 of the finished splash guard 10. It will be understood that the slab 20' may be placed in the cavity 31 first if desired and the stiffener member 21 laid on top of the slab.

FIGURE 7 shows a subsequent step wherein an upper mold half 33 is lowered onto and pressed firmly over the bottom mold half 30. Said upper mold half has a rectangular raised portion 34 adapted to fit within the cavity 31 and an additional raised central portion 35 around which the thickened side edge portion 22 and upper edge portion 23 are formed. Suitable means (not herein shown) are provided for firmly clamping the mold halves 30 and 33 together whereby the slab 20' is pressed downwardly and forced to flow in and around the metal strip 25 and into the openings 24 in the mesh. The incising edges of said strips bite into the uncured slab thus facilitating the integral joining of the two elements. At the time that the slab 20' is being pressed into the mesh of the stiffener member 21, heat is preferably applied for curing the rubber whereby the stiffener becomes an integral part of the splash guard, completely embedded within the rubber and locked firmly therein. However, the heat may be applied after the pressing operation if desired.

It is anticipated that materials other than rubber may be used for the slab 20'; as, for example: synthetic rubber, latex, balata, plastic or asphalt. In the use of thermoplastic substances, the slab is preferably softened somewhat prior to pressing the stiffener member 21 therein, or the material may be melted to a liquid state and poured into a mold cavity having a stiffener member disposed therein.

The stiffener member 21 not only provides stiffness for the splash guard 10, but it also affords a reinforcement of great strength. Although said stiffener member is substantially rigid, the inherent flexibility of the metal allows it to flex sufficiently to avoid permanent distortion if it is bent by contact with a solid object, such as a loading dock. However, the substantial rigidity of the splash guard causes it to deflect heavy debris such as rocks and stones in an improved manner thereby affording increased protection for vehicles approaching a truck from behind.

What is claimed is:

1. A vehicle splash guard comprising a substantially flat sheet of flexible material adapted to be suspended vertically behind the wheel means of a vehicle; a generally flat stiffener member of rigid material, spaced portions of said member being of substantially the same thickness as said sheet; said stiffener member being embedded within said sheet whereby said spaced portions extend substantially through the thickness of said sheet to stiffen the same and prevent flapping of the splash guard; said stiffener member extending throughout substantially the top half of said splash guard.

2. A vehicle splash guard as set forth in claim 1: said stiffener member being of mesh form wherein strips of said rigid material define a pattern of openings, said strips overlapping at said spaced portions and extending substantially through the thickness of said sheet.

3. A vehicle splash guard as set forth in claim 1: said stiffener member comprising expanded metal having openings therein defined by strip portions of said metal integrally connected and overlapping edgewise at said spaced portions.

4. A vehicle splash guard as set forth in claim 1: said sheet of flexible material having integrally formed edge portions along the side and top edges thereof of greater thickness than the remainder of said sheet, the upper and side edges of said stiffener member extending into said integrally formed edge portions.

References Cited

UNITED STATES PATENTS

| | | | |
|---|---|---|---|
| 2,619,363 | 11/1952 | Wenham et al. | 280—154.5 |
| 2,836,863 | 6/1958 | Denker | 161—111 |
| 3,051,508 | 8/1962 | Federspiel | 280—154.5 |
| 3,279,818 | 10/1966 | Jones | 280—154.5 |

BENJAMIN HERSH, Primary Examiner

JOEL E. SIEGEL, Assistant Examiner